3,386,817
PROCESS FOR THE REDUCTION OF
METAL OXIDES
Gilbert S. Layne and James O. Huml, Midland, Mich., and Richard D. Smith, Madison, Conn., assignors to The Dow Chemical Company, Midland, Mich., a corporation of Delaware
No Drawing. Filed Sept. 10, 1965, Ser. No. 486,556
6 Claims. (Cl. 75—84)

This invention relates to an improved process for the reduction of metal oxides and more particularly relates to a process for the thermal reduction of metal oxides by a metal reducing agent in the presence of molten $Al_2S_3$.

It is known to reduce metal oxides to the corresponding metal with aluminum at elevated temperatures. The known process generally involves heating finely divided aluminum and a metal oxide to produce the metal plus $Al_2O_3$. Such a process, however, must be conducted in relatively small batches due to the rapid heat evolution involved. Also, the reaction generally will not go to completion as the $Al_2O_3$ tends to coat the metal oxide being reduced. Separation of the metal from the $Al_2O_3$ is difficult due to sintering and the use of various metal halide fluxes has met with only very limited success.

It is an object of this invention to provide an improved process for the reduction of metal oxides. It is a further object of this invention to provide a process for the thermal reduction of metal oxides with a metal reducing agent which produces a relatively pure metal product, rapidly, in good yields and in an easily recoverable form. It is a further object of this invention to provide a process for the reduction of metal oxides which may be conducted continuously or in relatively large batches. These and other objects and advantages of the process will be readily appreciated and better understood by reference to the following detailed description.

It has now been discovered that metal oxides may be reduced to the metal thereof by the reaction of such metal oxide with a reducing agent selected from the group consisting of aluminum, silicon, calcium and magnesium at elevated temperature in the presence of $Al_2S_3$ as a solvent or diluent for the reaction system.

Metal oxides which are subject to reduction in the process of this invention include the oxides of titanium, zirconium, hafnium, tantalum, chromium, throium, vanadium and the like. The metal oxide to be reduced must, of course, be non-volatile at the melting point of $Al_2S_3$ and its sulfide must be less thermodynamically stable than $Al_2S_3$. It has been surprisingly discovered, however, that in this process the metal oxide to be reduced need not be less thermally, or thermodynamically, stable than the oxide of the reducing metal. The product of such reaction is generally the intermetallic compound or alloy of the reducing agent and the product metal.

As metallic reducing agents, aluminum, silicon, calcium or magnesium may be employed. The aluminum is particularly advantageous, however. In order to achieve the advantages of this process, it is necessary that the reduction be carried out in the presence of liquid $Al_2S_3$. Sufficient $Al_2S_3$ must be maintained in the reaction zone to dissolve the aluminum oxide or other oxides produced by the reduction. Additional $Al_2S_3$ may be used, however, and the use of such excess is frequently desirable to assure a low viscosity reaction system.

When aluminum metal is used as the reducing agent, $Al_2S_3$ serves as a solvent for the metal oxide to be reduced, a partial solvent for the aluminum and a solvent or complexing agent for the $Al_2O_3$ produced. Since $Al_2S_3$ is at least a partial solvent for the reactants, molecular contact is made between such reactants which produces rapid and complete conversion of the metal oxide to the free metal. Usually a reaction time of from 30 minutes to 2 hours is sufficient to assure complete reduction of the metal oxide. Longer contact times are not generally detrimental, however.

When silicon, calcium or magnesium are employed as reducing agents, it is thought that an intermediate reaction occurs with the $Al_2S_3$ to form the sulfide of the reducing agent and consequent release of aluminum metal. The aluminum then reduces the metal oxide. Sufficient $Al_2S_3$ must be present, therefore, to both react with the reducing agent and to dissolve the $Al_2O_3$ present. The CaS or MgS thus formed dissolves in the $Al_2S_3$ and may be separated as products. The SiS thus formed will leave the reaction zone as a gas. It is known that CaS and MgS are formed when their respective metals are used as reducing agents herein but the actual mechanism is not known with certainty and this invention is not to be construed as limited thereto.

The reaction temperature must be above the melting point of $Al_2S_3$ and below its boiling point at the pressure employed. At atmospheric pressure, therefore, the reaction temperature may be between about 1075° C. and about 2100° C. Such temperatures may be varied by varying the pressure on the reaction system but pressure is not a critical factor in this process and atmospheric pressure is generally the most convenient. Since relatively high temperatures are involved in this process and molten metals are exposed to the atmosphere in the reaction zone, it is desirable that such atmosphere be chemically inert to the reactants and products. An atmosphere of an inert gas such as argon has been found to be suitable.

If the oxide to be reduced is a solid at reaction temperature, it is desirable that such oxide be in a finely comminuted form to increase its rate of dissolution in $Al_2S_3$.

The use of $Al_2S_3$ as a solvent and diluent in the reaction system likewise makes it possible to control the particle size of the metal product by varying the residence time and temperature or by controlling the cooling rate of the reaction mass. For example, flakes of titanium maintained at 1800° C. for 2 hours produces flakes of about 1 mm. in size whereas the same material held at 1600–1650° C. for 1 hour produces flakes of only about one-fourth mm.

In order to provide ease in understanding, the following examples are set forth to illustrate the invention but are not to be construed as limiting to the scope thereof.

Example 1

A mixture of 120 g. of $TiO_2$, 54 g. of Al and 100 g. of $Al_2S_3$ in a graphite crucible was heated to 1800° C. at atmospheric pressure for two hours by induction heating. The reaction zone was maintained in an argon atmosphere. At the end of the reaction period, the melt was allowed to cool to room temperature, leached with water and analyzed. Analysis of the water leached product showed it to contain $Al_2O_3$, $Al(OH)_3$ and titanium metal powder. No $TiO_2$ was present. Separation of $Al_2O_3$ and $Al(OH)_3$ from Ti metal is easily accomplished by using the water overflow technique whereby the $Al_2O_3$ and $Al(OH)_3$ will be carried out by the flowing stream of water and the heavier titanium metal particles will remain behind.

Example 2

A mixture of 40 g. $TiO_2$, 42 g. Al and 75 g. $Al_2S_3$ was heated in a graphite crucible to 1600° C. at atmospheric pressure for 1 hour by induction heating. The reaction zone was maintained in an argon atmosphere. At the end of the reaction period, the melt was cooled to room temperature and leached with water to produce a residue of metallic flakes and oxide powder. The powder was washed away by water overflow and the metal flakes collected. Analysis of the metal showed them to contain equal parts of aluminum and titanium.

Example 3

A mixture of 61.5 g. $ZrO_2$, 63.5 g. Al and 75 g. $Al_2S_3$ was heated in a graphite crucible to 1700° C. at atmospheric pressure for 1 hour by induction heating. The reaction zone was maintained in an argon atmosphere throughout the reaction. At the end of the reaction period, the melt was cooled to room temperature, leached with water and the products were analyzed. Analysis of the solid product after water leaching showed it to contain metal flakes and a white powdery oxide. The flakes were washed free of the oxide and analysis showed them to contain Al and Zr in the ratio of the compound $ZrAl_3$. X-ray diffraction data confirmed this identification.

We claim:

1. A process for the reduction of refractory metal oxides which comprises admixing said metal oxide with $Al_2S_3$ and a reducing agent selected from the group consisting of aluminum, magnesium, calcium, and silicon at a temperature between the melting point and the boiling point of $Al_2S_3$ at the pressure employed for a period sufficient to affect such reduction.

2. A process for the reduction of refractory metal oxides to the corresponding metal wherein said metal oxide is non-volatile at the melting point of $Al_2S_3$ and the sulfide of the metal to be produced is less thermodynamically stable than $Al_2S_3$ which process comprises admixing said metal oxide with $Al_2S_3$ and a reducing agent selected from the group consisting of aluminum, magnesium, calcium and silicon at a temperature between the melting point and the boiling point of $Al_2S_3$ at the reaction pressure employed for a period sufficient to affect such reduction.

3. The process of claim 2 wherein the metal oxide is $TiO_2$.

4. The process of claim 2 wherein the metal oxide is $ZrO_2$.

5. The process of claim 2 wherein the reducing agent is aluminum.

6. A process for the reduction of $TiO_2$ to metallic titanium which comprises admixing said $TiO_2$ with $Al_2S_3$ and metallic aluminum at a temperature of between 1075 and 2100° C. and at substantially atmospheric pressure for a period of from 30 minutes to 2 hours.

References Cited

UNITED STATES PATENTS

| | | | |
|---|---|---|---|
| 2,995,439 | 8/1961 | Litz | 75—84 |
| 3,047,477 | 7/1962 | Spraul et al. | 75—84 X |
| 3,099,555 | 7/1963 | Teitel | 75—84.1 |
| 3,184,302 | 5/1965 | Chindgren | 75—84 |
| 3,288,593 | 11/1966 | Smith et al. | 75—84 |
| 3,288,594 | 11/1966 | Smith | 75—84 |

CARL D. QUARFORTH, *Primary Examiner.*

M. J. SCOLNICK, *Assistant Examiner.*